Oct. 29, 1935.  J. M. CRAWFORD ET AL  2,018,706
TRANSMISSION MECHANISM
Filed April 25, 1932   4 Sheets-Sheet 4
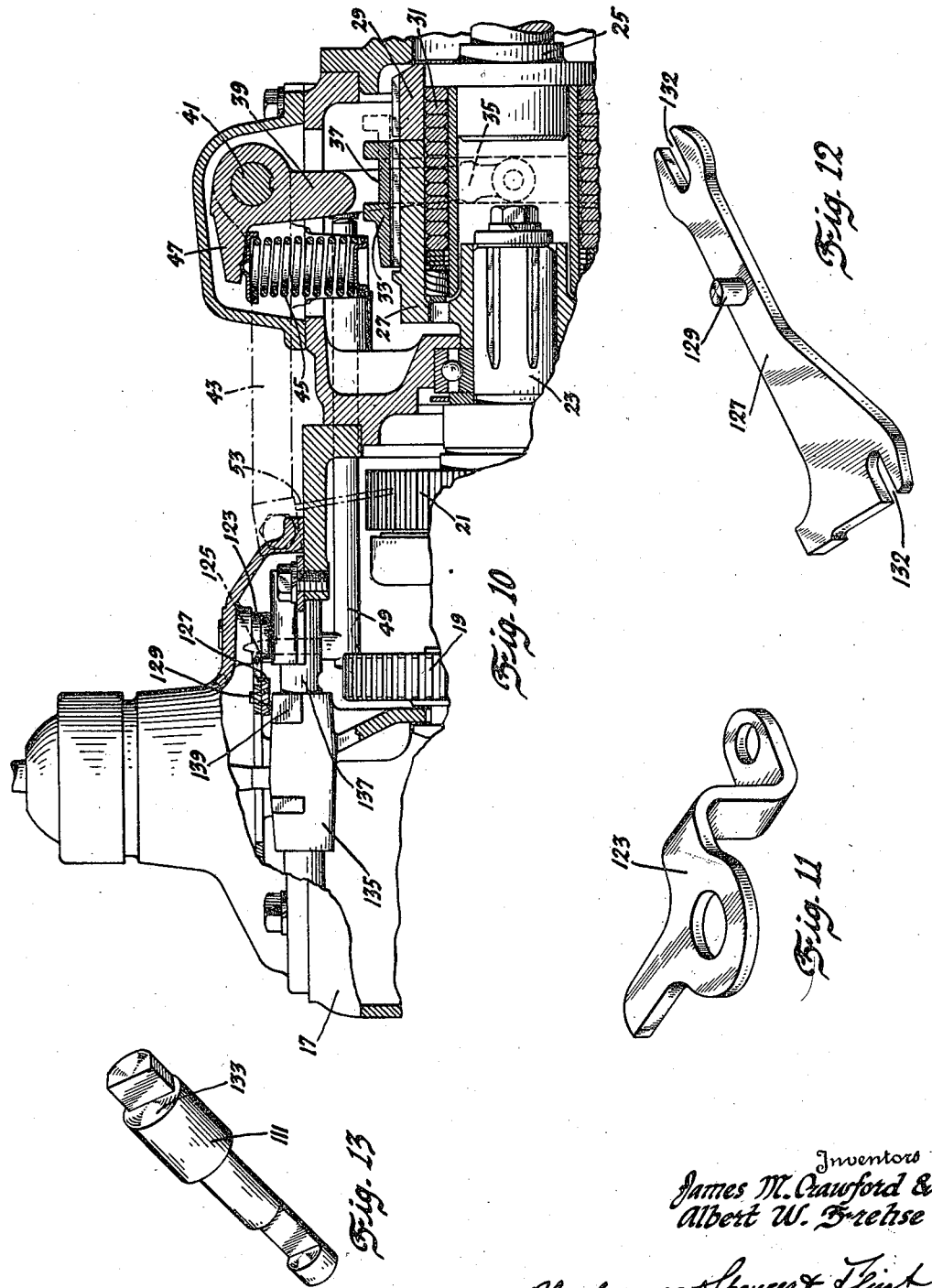
Inventors
James M. Crawford &
Albert W. Frehse
By Blackmore, Spencer & Flint
Attorneys Patented Oct. 29, 1935

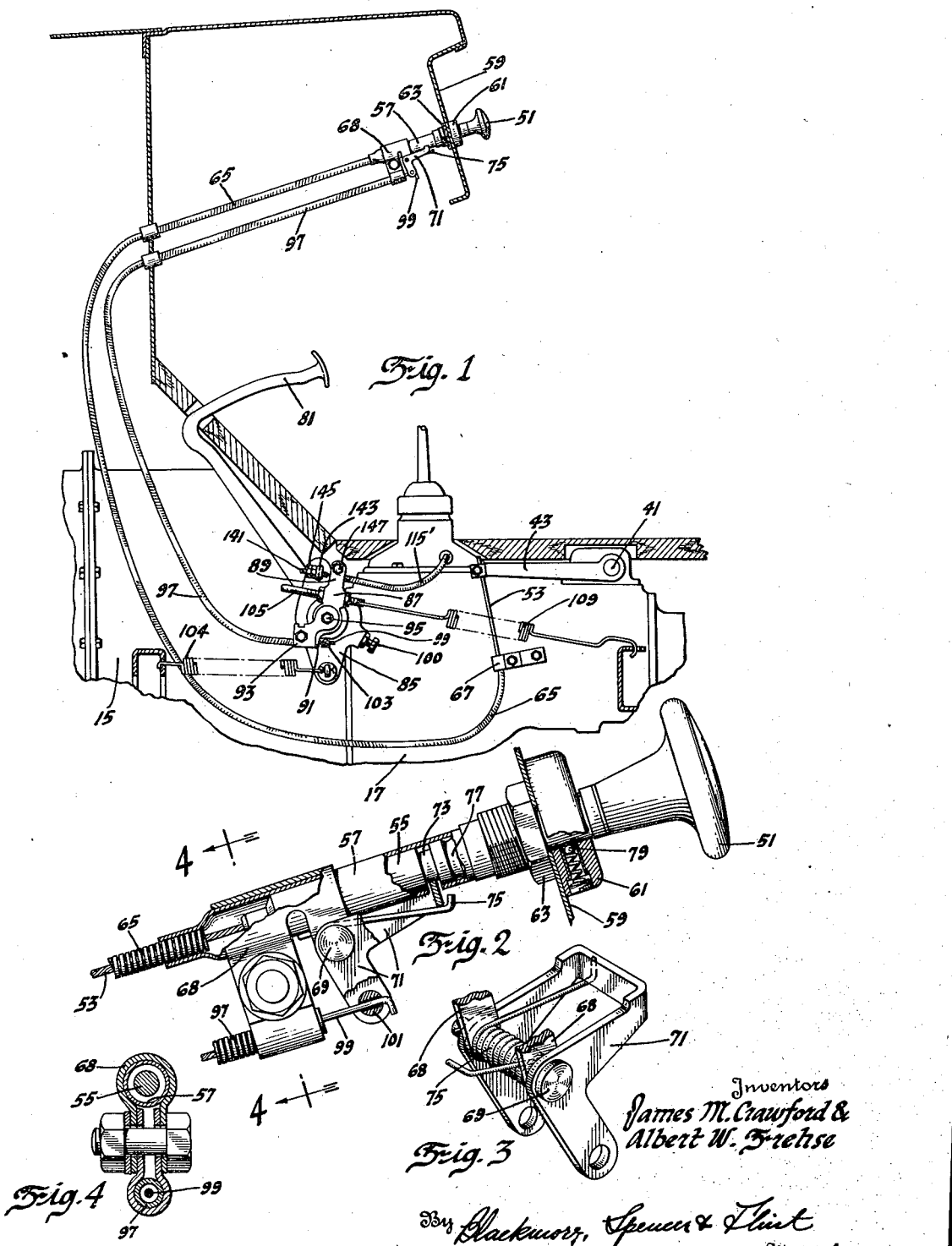

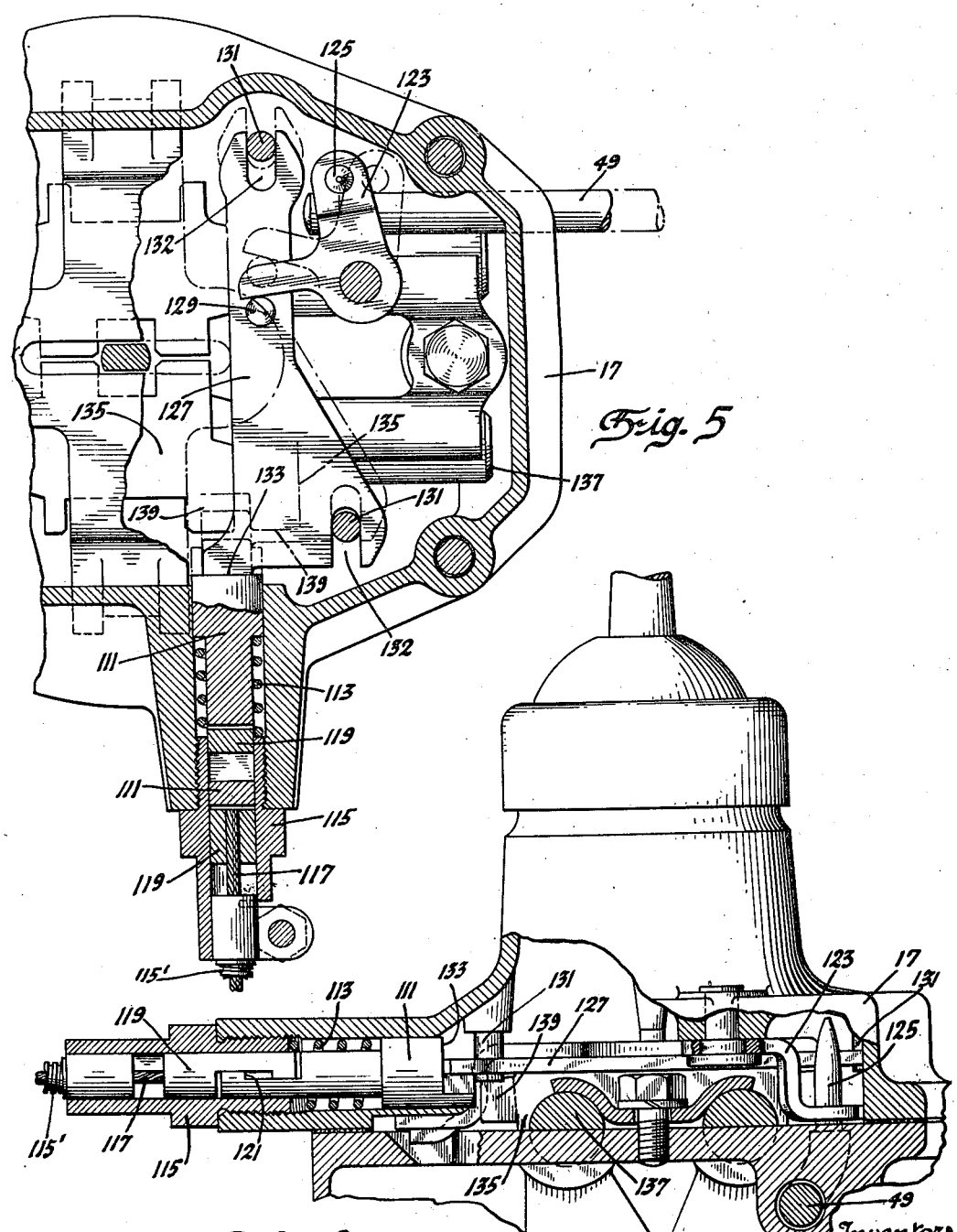

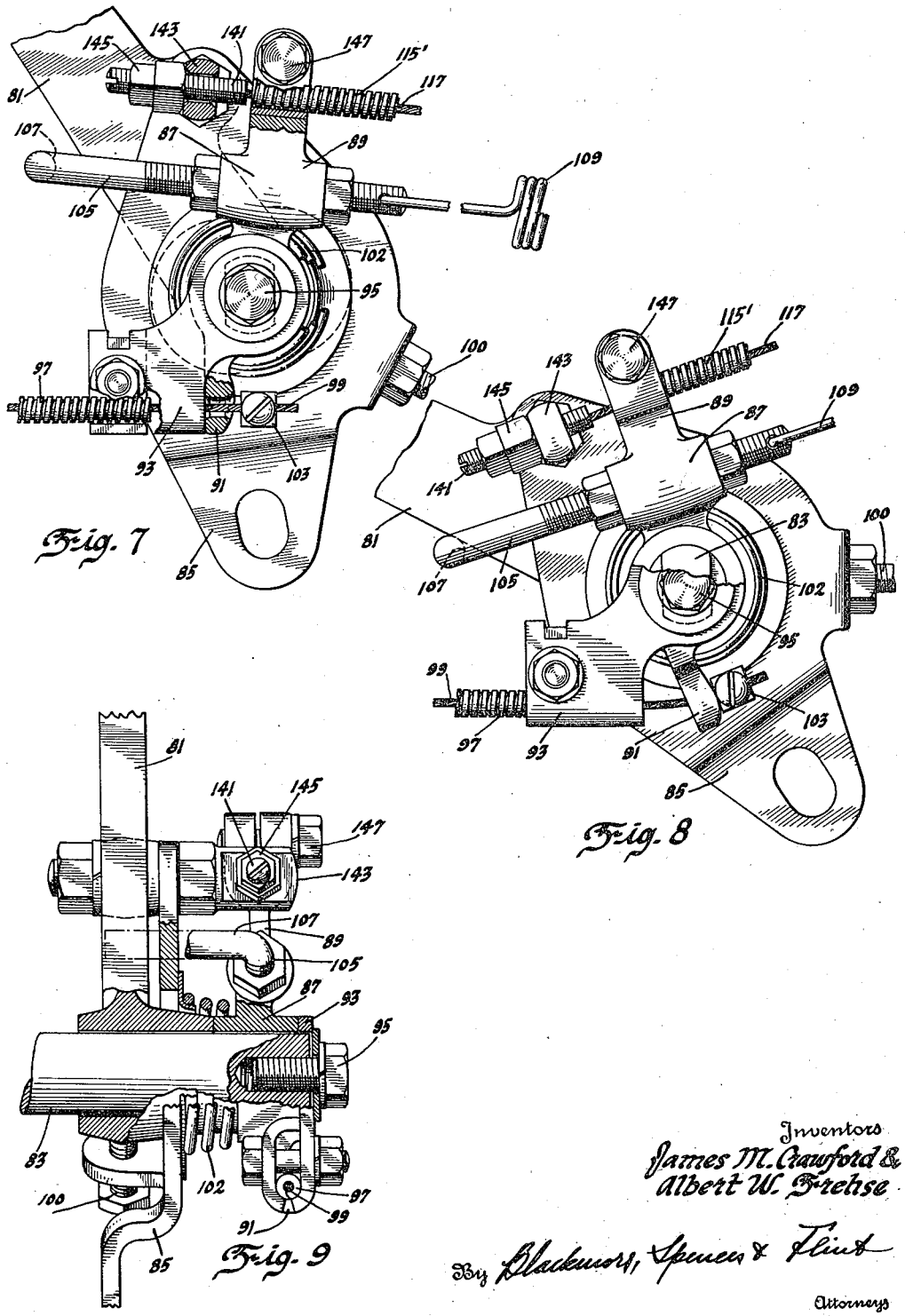

2,018,706

UNITED STATES PATENT OFFICE 2,018,706

TRANSMISSION MECHANISM

James M. Crawford and Albert W. Frehse, Detroit, Mich., assignors to General Motors Corporation, Detroit, Mich., a corporation of Delaware Application April 25, 1932, Serial No. 607,394

11 Claims. (Cl. 192—3.5)

This invention relates to transmission mechanism and has been designed particularly for use on motor vehicles equipped with free wheeling devices.

With cars so equipped the operator frequently wishes to change from free wheeling to positive drive. This involves the engagement of positive clutch elements associated with parts normally connected by an overrunning clutch. If the members of the positive clutch are not in synchronism it will be clear that one or the other should be released from any driving force to permit the engagement of the clutch elements. One of these clutch elements is engine driven, and the other is driven by the momentum of the car. The latter driving connection cannot be disconnected but the power transmission from the engine can easily be interrupted by releasing the main friction clutch. If, for example when coasting, it is desired to shift to positive drive in order to make use of the engine as a brake, it would be possible to race the engine to effect synchronization and then engage the positive clutch. It has been found difficult, however, for drivers inexperienced with free wheeling to learn this operation. It is also possible to accomplish the result by releasing the main clutch, but careless drivers frequently forget to do so. It is therefore an object of this invention to provide means for preventing the shift into positive clutch engagement prior to the release of the main clutch. Again, drivers of cars equipped with free wheeling become accustomed to shifting to and from second speed and high speed without releasing the friction clutch. This they are able to do because in decelerating the engine the car momentum causes an overrunning of the free wheel clutch, thus permitting the shifting. It frequently happens that drivers, acquiring the habit of shifting without first releasing the clutch when driving with the free wheeling device in operation, attempt to change speeds without releasing the clutch when the positive clutch is in operation. Much damage has been done to the transmission lines of cars in consequence of this operation. It is an object of this invention to prevent such shifting without clutch releasing when the positive clutch is engaged.

To accomplish the above objects there is provided a latch associated with the second and high speed fork in the change speed transmission. This latch is to be engaged with the fork whenever the positive clutch, associated with the free wheeling device is engaged, and to be released from engagement with the shifting fork whenever the car is in free wheeling condition. There is also a latch associated with the manually operable means for engaging the jaw clutch for rendering the free wheeling device inoperative. Both these latches are released by the first part of the movement of the clutch pedal. In consequence it is impossible to change from free wheeling to positive drive without first releasing the clutch. It is also impossible when driving the car in positive drive to shift from second to high or vice versa until the main clutch has been released.

It may therefore be said to be the object of this invention to improve and render safe the operation of cars equipped with free wheeling devices.

Other objects, such as simplicity and economy, will be obvious.

The improved device is shown in the accompanying drawings wherein—

Fig. 1 is a view in side elevation of a vehicle transmission equipped with our improvements.

Fig. 2 is a view in side elevation, partly in section, of the control mechanism mounted on the instrument board.

Fig. 3 is a view of a latch in perspective.

Fig. 4 is a section on line 4—4 of Fig. 2.

Fig. 5 is a top plan view, partly broken away and in section, of the change speed mechanism.

Fig. 6 is a transverse section through the change speed housing.

Fig. 7 is a view in elevation of the hub portion of the friction clutch pedal and the associated parts.

Fig. 8 is a view similar to Fig. 7 showing the parts in a second position of adjustment.

Fig. 9 is a view in end elevation, parts being shown in section, of the clutch pedal hub assembly.

Fig. 10 is a vertical section through the transmission housing and the free wheeling device.

Fig. 11 is a perspective of a lever used in the change speed unit.

Fig. 12 is a perspective of a rod reciprocated by the lever.

Fig. 13 is a perspective of a transmission locking latch.

On the drawings to the rear of the engine is a clutch housing 15, and at the rear of this housing is the change speed housing 17 for enclosing any preferred form of speed ratio gearing. This transmission as shown includes a gear 19 (see Fig. 10) slidable axially to effect shifts into low speed and reverse. This figure also shows the second speed driven gear at 21. The shaft 23, rotated by the change speed mechanism, is in axial alignment with driven shaft 25 which is to drive the vehicle wheels. Shafts 23 and 25 are shown equipped with cups 27 and 29, housing a free wheel or one-way clutch spring 31. This is a well known form of free wheeling spring clutch. The spring is secured to the driven element 25, the attachment not being in the plane of the section. When the engine drives the vehicle the spring expands to grip the two cups. When the car overruns, the spring releases the cups from joint rotation so that "free wheeling" may take place. No novelty is herein claimed for the free wheeling clutch per se and no further description is included. Slidably splined on cup 27 is a positive clutch element 33 operated by means of a fork 35 engaging a collar 37 on the clutch element 33 so that this clutch element may be moved into engagement with clutch teeth on the cup 29 whereby positive drive is effected and the overrunning clutch rendered inoperative. The fork 35 constitutes a part of a lever 39 which rocks on a pivot pin 41 which lever, externally of the housing for the free wheel clutch, carries an arm 43. Within the housing a spring 45 engages an arm 47 of the lever 39, thus acting to normally disconnect the positive clutch and maintain the free wheeling clutch in operation. As a result of this construction the engine may drive the car in a forward direction only. The car, under the influence of its momentum, may move freely without rotating shaft 23. A rod 49 is slidably mounted in the housing and is moved to the rear by the rearward movement of gear 19 to its reverse driving position. This rod 49 engages lever 39 and when so moved to the rear it rocks the lever 39 and effects engagement of the positive clutch teeth. As a result the car may be driven in a reverse direction by the engine. When gear 19 is again moved forward to its neutral or its low speed position, the spring 45 rocks the lever 39 to its free wheeling position, rod 49 being permitted to move forwardly because of the forward movement of gear 19.

For the purpose of driving the car positively in a forward direction and to eliminate the free wheeling clutch, there is provided on the instrument board a button or knob 51 connected to a flexible cable 53 by means of a member 55 reciprocable in a tube 57 which is suitably mounted on the instrument board 59 by a head 61 and a nut 63. The other end of the flexible cable is attached to the lever 43. The cable is enclosed in a housing 65 which is secured to the end of tubular member 57 and to a clip 67 adjacent the end of lever 43.

The drawings (Figs. 1 and 2) shows the parts in free wheeling position. A fitting 68 is secured to tube 57. Pivoted to this member 68 as at 69 is a latch 71, one end of which engages in a notch 73 of the rod 55 under the influence of a spring 75. To operate the button from its free wheeling position to its positive drive position this latch must be released. A groove 77 is formed in rod 55, this groove to be engaged by spring-pressed balls, one of which is shown at 79, when the button is pulled out to positive drive position. This expedient serves as a detent to yieldingly hold the button in positive drive position from which it may at any time be returned to free wheeling position by slight pressure on the button.

One of the objects is to prevent a change from free wheeling to positive drive without first releasing the clutch. It is found desirable, therefore, to make the release of latch 71 dependent upon the depression of the clutch pedal. To that end the following construction is arranged, reference being made to Fig. 1 and Figs. 7-9 inclusive. Numeral 81 is the clutch pedal rotatable on shaft 83. At 85 is a stamped lever through which the clutch pedal is operative upon the clutch in a way with which this invention is not concerned. The pedal and the lever are secured together at one point by fastening means at 143 and are adjustable relative to each other by means of bolt 100. Also rotatable on shaft 83 is the hub member 87 having an upper arm 89 and a lower arm 91. Preferably an anti-rattling spring 102 is located between hub member 87 and lever 85. A clutch releasing spring 104 is secured to the lower end of lever 85 as shown. A stamping 93 is clamped to the end of shaft 83 by a nut 95 whereby the stamping is held from rotation. The stamping carries one end of a cable housing 97, the other end of which is fixed to the member 68 adjacent the instrument board. A flexible cable 99 extending through the housing 97 is attached as at 101 to the latch 71. The other end of the cable has secured thereto an abutment 103 to be engaged by the lower arm 91 as it rotates, whereby the cable is pulled and the latch 71 released. The means to effect this operation by the rotation of the clutch pedal comprises a rod 105 adjustably held to the upper arm 89 and having a hooked end 107 located in the path of movement of the pedal. A spring 109 is hooked to the rod 105 and anchored to the frame or any fixed part of the vehicle to normally retain the arm 91 in contact with the stamping 93. When it is desired to change from free wheeling to positive drive the latch 71 must be released and its release is effected by depressing the clutch pedal. The pedal picks up the hook 107 carried by arm 89 whereupon the arm 91 moves toward and engages the abutment 103 as a result of which the cable is pulled and the latch released. In thus releasing the latch the clutch has been released so that no harm may ensue from the shifting to positive drive by pulling on the knob 51.

Damage may also result from shifting gears with the transmission equipped with free wheeling clutch as explained above in the event that provision is not made to prevent gear shifting without first releasing the clutch when the car is in positive drive. In the transmission is a latch 111 (see Figs. 5 and 6) projected by a spring 113 which acts against a shoulder on the latch and against the end of the plug 115 threaded into the housing. A cable 117 is attached to a member 119. This member 119 is arranged to engage a shoulder 121 on the latch 111. The member 119 may be withdrawn by the cable and when so withdrawn it withdraws the latch against the tension of spring 113. The cable housing 115' is suitably secured in the end of the plug 115. When the free wheeling clutch is in operation the rod 49 is pushed forward as explained above. In moving to its forward position its front end rocks a bell crank lever 123 by means of a pin 125 extending upward from the end of the rod. The bell crank lever as it rocks engages an abutment 129 on a plate 127 whereby the plate 127 is reciprocated. The plate 127 is guided by pins 131 in slots 132. The end of plate 127 engages a shoulder 133 on the latch 111 and pushes it back against the tension of spring 113. Unless so pushed back the end of rod 111 is projected by its spring 113 into engagement with the high and second speed fork 135 which is slidable on shift rod 137 in such a way as to prevent shifting of the fork 135. When in positive drive condition the parts are in the dotted line position (see Fig. 5) and the latch 111 may then engage the fork 135. The fork has a lug 139, the one side or the other of which may be engaged by the latch 111 depending upon whether the fork is in its high speed or second speed position.

The other end of the cable 117 is connected to the clutch pedal. From Figs. 7, 8, and 9 it will be seen that cable 117 is provided with a tip 141 which extends through an opening in the part 143 carried by the pedal 81 and the lever 85. Suitable nuts 145 on the tip 141 engage the part 143 carried by the pedal, so that the depression of the pedal pulls the cable 117. The cable housing is clamped to the end of arm 89 by suitable fastening means 147. It will be seen that the first movement of the pedal (during the period of relative movement between the pedal 81 and the lever 85) pulls the cable 117 and releases the latch 111. Thereafter, since the member 87 with the arm 89 moves with the pedal, owing to the engagement of the pedal with the hook 107, the cable and housing have no relative movement. Further pedal depression then functions merely to straighten out the curvature of the housing 115' and its contained cable. A considerable pedal movement is thus made possible, only the first part of which is operable to move the latch. By this means it is possible to give the latch just the small movement necessary to effect its release while permitting the pedal to have the longer travel necessary for complete clutch operation. By means of this construction the depression of the pedal becomes a necessary step prior to the change from free wheeling to positive drive. Such a pedal depression is also necessary to permit shifting to and from high and second speed when the positive clutch associated with the overrunning clutch is in operative position. The construction described is therefore a safety mechanism to prevent damage to the power transmission of a car equipped with a free wheeling device.

The operation of the device is as follows: Let it be assumed that the free wheeling unit is in its free wheeling position, the member 33 occupying the position shown by full lines in Fig. 10 and the button 51 on the panel being as shown in Fig. 1. The engine then drives the car through the instrumentality of the clutch, change speed transmission, and the free wheel unit. The latter is operable to drive the car in the forward direction only. While so driving, the car may overrun, as in coasting, with the clutch released in the conventionally equipped car. Under these circumstances shifts may be made without releasing the clutch. For driving in reverse the rod 49 is reciprocated in the act of engaging the reverse gears so that the car may be driven in a backward direction. To adapt the mechanism for conventional positive driving button 51 is manipulated to slide part 33 to the dotted line position of Fig. 10 where it locks together the parts 27 and 29. Such an operation of the button 51 requires the release of latch 71 and this release is accomplished by the depression of the clutch pedal. Therefore, the change from free wheeling to positive driving can be made only by first releasing the clutch. When the parts are in positive driving position the rod 49 is moved rearwardly and the latch 111 engages the low and second speed shift member under the influence of spring 113. Shift between second and high speed may then be made only after first releasing the clutch, which releasing action withdraws the latch 111.

We claim:

1. In combination with a power transmission having a main clutch operating member, a change speed mechanism including a member movable to change driving ratios, an overrunning device, the latter equipped with an optionally engageable positive clutch, means movable in response to a releasing movement of the main clutch to permit engagement of said positive clutch and other means engaging said movable member to prevent movement thereof when the positive clutch is engaged and movable to release said movable member for ratio changing movements in response to a releasing movement of the main clutch.

2. In combination with a power transmission, a main clutch-operating member and a free wheeling device, the latter equipped with an optionally engageable positive clutch to render the free wheeling device inoperative, means adjacent said free wheeling device to shift said positive clutch to clutch-engaging position, remote manually operable means, a flexible connection between said clutch shifting means and said manually operable means, a latch device to normally prevent the operation of said positive clutch to clutch-engaging position and mechanism operated by the movement of the main clutch-operating member to release said latch, said mechanism including a flexible cable connected to said latch, a rotatable member adjacent said main clutch-operating member and rotatable coaxially therewith, said last-named member having a part engageable by said main clutch-operating member whereby the two rotate together, and means on said flexible member engageable by said rotatable member whereby the latch may be released from engagement with the manually operable means.

3. In combination with transmission mechanism, a main clutch-operating member, change speed mechanism including a movable speed ratio changing member, a free wheeling device having an optionally operable positive clutch associated therewith to render the free wheeling device inoperable, a latch to engage and prevent movement of said speed ratio-changing member, means associated with the positive clutch to render said latch inoperative to lock said speed ratio-changing member when the positive clutch is in inoperative position, a flexible cable operably connecting said latch and said main clutch-operating member, whereby a releasing movement of the main clutch may operate by means of the cable to release the latch and permit speed ratio changing.

4. In combination, a main clutch pedal, a change speed mechanism having a movable change speed member, a latch movable to engage and prevent movement of said member, a free wheeling device having an optionally operable positive clutch to render the free wheeling device inoperative, means associated with the free wheeling device and the change speed mechanism to render the latch inoperable upon said change speed member when the free wheeling device is operable, manually operable means to control the position of the positive clutch, a locking latch associated therewith, and mechanism operable by the main clutch pedal to release said latches.

5. In combination with power transmission mechanism including change speed mechanism and an overrunning clutch, the latter equipped with positive clutch means to render the overrunning clutch inoperable, latches to prevent the movement of the positive clutch means to locking position and to prevent a shifting movement of the change speed mechanism when the positive clutch is in operative position, and means to release said latches.

6. The invention defined by claim 5 together with a main clutch-operating means, said latch-releasing means being operated by said main clutch-operating means.

7. In combination, a main clutch pedal, a change speed transmission having a locking latch therein, means to release said latch, a cable connecting said latch-releasing means and said pedal, a housing for said cable, means fixedly anchoring the end of said housing adjacent the latch, means anchoring the other end of said cable, said last-named anchoring means being mounted for limited movement relative to the pedal connected end of the cable.

8. The invention defined by claim 7 together with a free wheeling clutch having an optionally operable positive clutch associated therewith, means operated by said positive clutch to release said transmission latch when the positive clutch is in inoperative position, manually operable means to render the positive clutch operable, a locking latch therefor and means operable to release said last-named latch by the actuation of the main clutch pedal.

9. In a motor vehicle, in combination, a clutch, a transmission having variable speed gearing, a free wheeling unit associated with said gearing, said free wheeling unit including parts mounted for independent rotation and a locking device movable to a position to lock said parts for joint rotation whereby the drive from the change speed gearing through the free wheeling device may be either a one direction drive or a two direction drive, means for shifting said gearing, separate means for shifting said locking device into and out of locking relation with said rotatable parts, means for locking said gearing in operative relation, means operatively connecting the locking means and clutch for rendering the locking means effective when the clutch is engaged and ineffective when said clutch is disengaged, and means actuated by the free wheeling shifting means for releasing the locking means independent of the operation of the clutch.

10. In a motor vehicle, in combination, a clutch and operating means therefor, a transmission having coacting driving elements relatively movable into and out of driving relation, a locking member for locking said elements against relative movement, a free wheeling unit associated with said transmission, means for controlling the operation of the free wheeling unit, a link connected with said clutch operating means and cooperating with said locking member to render the latter effective to lock said elements when said clutch is engaged and ineffective when said clutch is disengaged, and means operatively connecting said free wheeling unit controlling means and said locking means for releasing the locking means independent of the operation of the clutch.

11. In a motor vehicle, in combination, a main clutch and operating means therefor, a transmission having coacting driving elements relatively movable into and out of driving relation, a shifter slide for moving said driving elements into driving relation, a locking member for locking said shifter slide against relative movement, a free wheeling unit associated with said transmission, said free wheeling unit including a part movable to two positions in which the unit may serve as a one way driving means or a two way driving means, means for shifting the said movable part of the free wheeling unit into and out of each of its two said positions, connecting means engaging said locking member and connected with the clutch operating means to render the locking member effective to lock said shifter slide and elements when said main clutch is engaged and shiftable to release said locking member when the clutch is disengaged, and other means associated with said locking member and the free wheeling shifting means for shifting the locking member to release the shifter slide independent of the operation of the main clutch.

JAMES M. CRAWFORD.
ALBERT W. FREHSE.